(12) United States Patent
Kaplan

(10) Patent No.: US 7,958,546 B2
(45) Date of Patent: Jun. 7, 2011

(54) IDENTITY ACCESS MANAGEMENT SYSTEM

(75) Inventor: Robert A. Kaplan, Buffalo Grove, IL (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 10/879,798

(22) Filed: Jun. 29, 2004

(65) Prior Publication Data

US 2006/0021011 A1 Jan. 26, 2006

(51) Int. Cl.
G06F 7/04 (2006.01)
G06F 15/16 (2006.01)
G06F 17/30 (2006.01)
H04L 29/06 (2006.01)

(52) U.S. Cl. ............................................. 726/6; 705/50
(58) Field of Classification Search ........................ None
See application file for complete search history.

(56) References Cited

U.S. PATENT DOCUMENTS

| | | | | |
|---|---|---|---|---|
| 5,473,692 | A | 12/1995 | Davis | 380/25 |
| 5,784,463 | A | 7/1998 | Chen et al. | 380/21 |
| 5,812,669 | A | 9/1998 | Jenkins et al. | 380/25 |
| 5,872,848 | A * | 2/1999 | Romney et al. | 713/176 |
| 5,970,475 | A * | 10/1999 | Barnes et al. | 705/27 |
| 6,151,628 | A * | 11/2000 | Xu et al. | 709/225 |
| 6,192,131 | B1 * | 2/2001 | Geer et al. | 380/283 |
| 6,353,812 | B2 | 3/2002 | Frankel et al. | 705/44 |
| 6,385,651 | B2 | 5/2002 | Dancs et al. | 709/227 |
| 6,401,206 | B1 | 6/2002 | Khan et al. | 713/176 |
| 6,658,254 | B1 * | 12/2003 | Purdy et al. | 455/445 |
| 6,957,199 | B1 * | 10/2005 | Fisher | 705/78 |
| 7,162,640 | B2 * | 1/2007 | Heath et al. | 713/185 |
| 7,209,889 | B1 * | 4/2007 | Whitfield | 705/14.39 |
| 7,240,363 | B1 * | 7/2007 | Ellingson | 726/5 |
| 2002/0031230 | A1 * | 3/2002 | Sweet et al. | 380/278 |
| 2002/0032665 | A1 * | 3/2002 | Creighton et al. | 705/76 |
| 2002/0062249 | A1 * | 5/2002 | Iannacci | 705/14 |

(Continued)

FOREIGN PATENT DOCUMENTS

WO WO 0211011 A1 * 2/2002

OTHER PUBLICATIONS

Fatwallet cashback, Oct. 8, 2003, p. 1 and pp. 24-26.*

Primary Examiner — Michael Pyzocha
Assistant Examiner — Nadia Khoshnoodi
(74) Attorney, Agent, or Firm — Scully, Scott, Murphy & Presser, P.C.; Anna Linne, Esq.

(57) ABSTRACT

Disclosed are a method and system for managing access to and verifying personal identity. A person is provided with a private key that uniquely identifies that person, and that person uses the private key to access an identity manager. The person then uses the identity manager to specify a desire to establish a business relationship with a business entity. The user can then contact that business entity. The business entity is provided with a private key that uniquely identifies the business entity. That business entity then receives a request to conduct business with the entity from a person alleging to have the personal identity. The business entity then accesses the identity manager using the private key, and that entity then determines if a person having the personal identity has used the identity manager to specify a desire to conduct business with the business entity.

2 Claims, 3 Drawing Sheets

U.S. PATENT DOCUMENTS

| | | | |
|---|---|---|---|
| 2002/0128981 A1* | 9/2002 | Kawan et al. | 705/67 |
| 2002/0198803 A1* | 12/2002 | Rowe | 705/35 |
| 2003/0140011 A1* | 7/2003 | Ishimi et al. | 705/76 |
| 2003/0154376 A1* | 8/2003 | Hwangbo | 713/173 |
| 2003/0158960 A1* | 8/2003 | Engberg | 709/237 |
| 2004/0064710 A1* | 4/2004 | Vainstein | 713/189 |
| 2006/0005229 A1* | 1/2006 | Palekar et al. | 726/1 |

* cited by examiner

IDENTITY ACCESS MANAGEMENT SYSTEM

BACKGROUND OF THE INVENTION

1. Field of the Invention

This invention generally relates to an identity access management system, and more specifically, the invention relates to methods and systems for protecting against identity theft.

2. Background Art

Identity theft has become an important concern. A significant contributing factor is that an individual's social security number and other confidential identifying data are required on many application forms. As a result, individuals may lose control over what is applied for in their names.

Particularly with the growth of the Internet, the opportunity exists for a person to represent himself or herself, improperly and without authorization, as another person. This may be done, for instance, to make purchases, to obtain credit or debit cards, or for other purposes. This misrepresentation may be done by using, for example, a stolen social security number or bank account number or other confidential, personal identifying number.

Procedures are available to address the improper use of credit and debit cards. For example, a pairing of two tokens may be used to identify a card and by extrapolation the card holder. Also, with modern chipcards, the chip may contain an encrypted token and the card holder may supply another token, usually a personal identification number (pin). The combination of these tokens is used by the authorization system to identify the card. It is not possible to say that the proper card holder is using the card, though, because anyone could have the card and the pin. Nonetheless, this procedure, referred to as Authentication, does, to a significant degree, limit the fraud.

While Authentication is thus useful, it does not address the issue of a person attempting to obtain improperly a credit or debit card in the name of another person by using stolen or fraudulently obtained personal identification numbers.

SUMMARY OF THE INVENTION

An object of this invention is to provide an improved method and system for managing access to personal identity.

Another object of the invention is to provide a procedure for confirming the identity of a person using personal identification data.

These and other objectives are attained with a method and system for managing access to and verifying personal identity. In this method, a person is provided with a private key that uniquely identifies that person, and that person uses the private key to access an identity management system. The person then uses the identity management system to specify a desire to establish a business relationship with at least one business entity.

After this is done, the user can contact that business entity. The business entity is provided with a private key that uniquely identifies the business entity. That business entity then receives a request to establish a business relationship with the entity from a person alleging to have the personal identity. The business entity then accesses the identity access management system using the private key, and that entity then determines if a person having the personal identity has used the identity access management system to specify a desire to establish a business relationship with the business entity.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
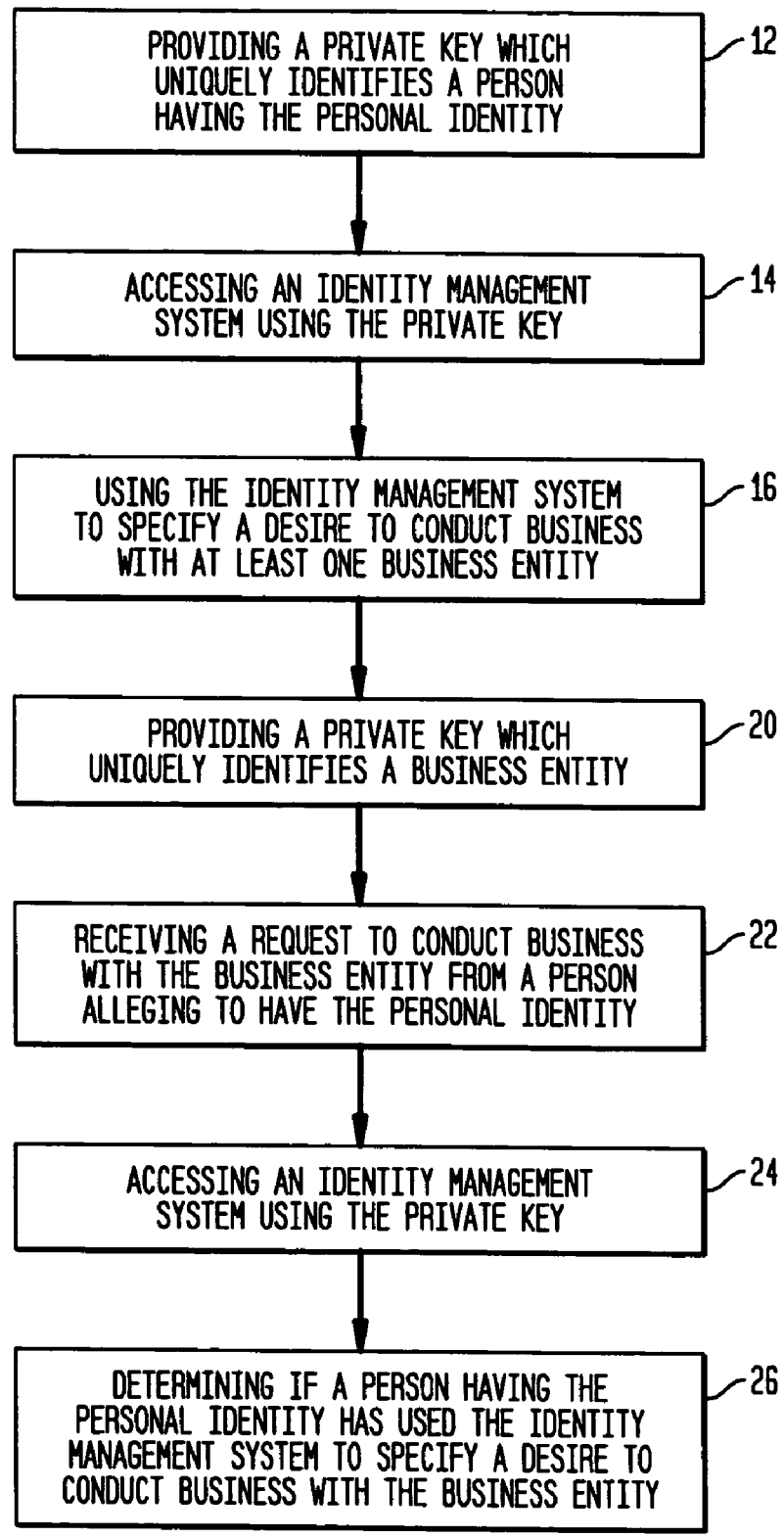
FIG. 1 is a flow chart showing an embodiment of the invention.

The present invention, generally, provides a method and system for managing access to and verifying personal identity. In accordance with the invention, and with particular reference to FIG. 1, a person is provided, at 12, with a private key that uniquely identifies that person, and that person uses the private key, at 14, to access an identity access management system. The person then, at 16, uses the identity access management system to specify a desire to establish a business relationship with at least one business entity.

After this is done, the user can contact that business entity. The business entity is provided, as represented at 20, with a private key that uniquely identifies the business entity. That business entity then, at 22, receives a request to establish a business relationship with the entity from a person alleging to have the personal identity. The business entity then, at 24, accesses an identity access management system using the private key; and that entity, at 26, then determines if a person having the personal identity has used the identity access management system to specify a desire to establish a business relationship with the business entity.

As will be understood by those of ordinary skill in the art, the present invention may be used in many different specific applications. The invention is particularly well suited to help insure that individuals who request a service, such as a credit or debit card, are who they represent themselves to be.

Figure 2:
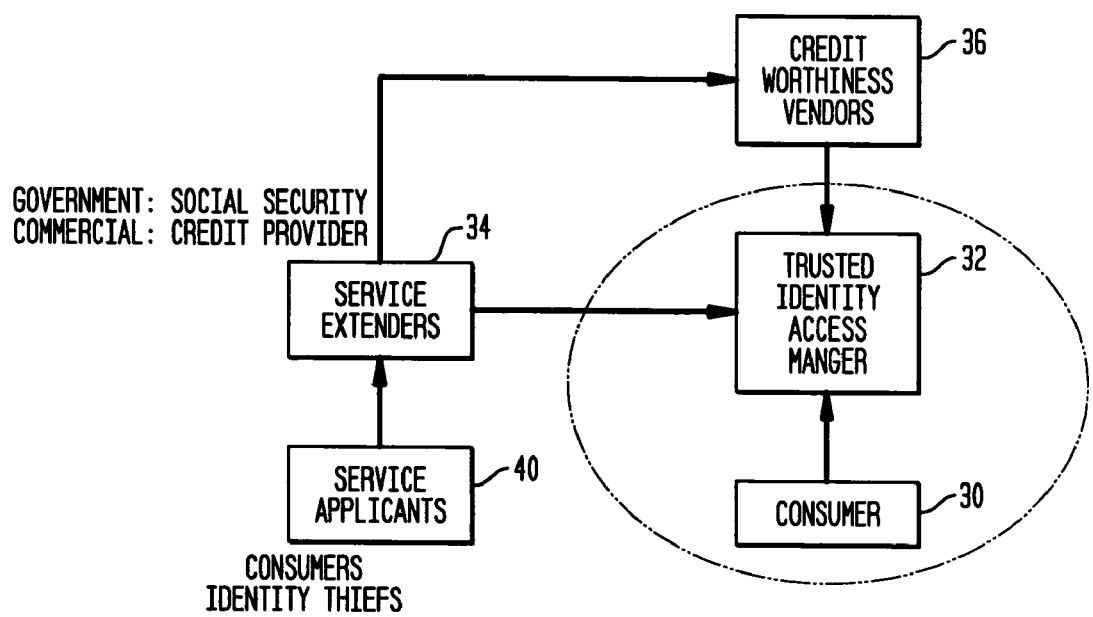
FIG. 2 schematically illustrates an identity access management system embodying the present invention.

With reference to FIG. 2, individuals, represented at 30, would have a private key that, for example, correlated to their social security number. The private key along with an individual's password would be needed for an individual to access and make selections within the identity access management system 32. An individual wishing to establish credit with a particular lender 34 would first add the lender and possibly other information, such as the lender retention record and a unique request code, to the list, which is kept in manager 32, of entities with which the individual wishes to establish relationships.

The individual would then fill out an application, generally as is done today, including a lender request code created by the individual. The company who extended the application to the individual would use credit agencies, in much the manner that they are used today. The credit agencies, represented at 36, along with the credit worthiness rating they provide, would check the identity access management system 32 to determine, by checking the lender request code, if the individual had in fact registered interest in establishing a business relationship with the lender. An unauthorized person, represented at 40, would not have the proper registration in manager 32, and would thus be denied the services by the service extender 34.

Figure 3:
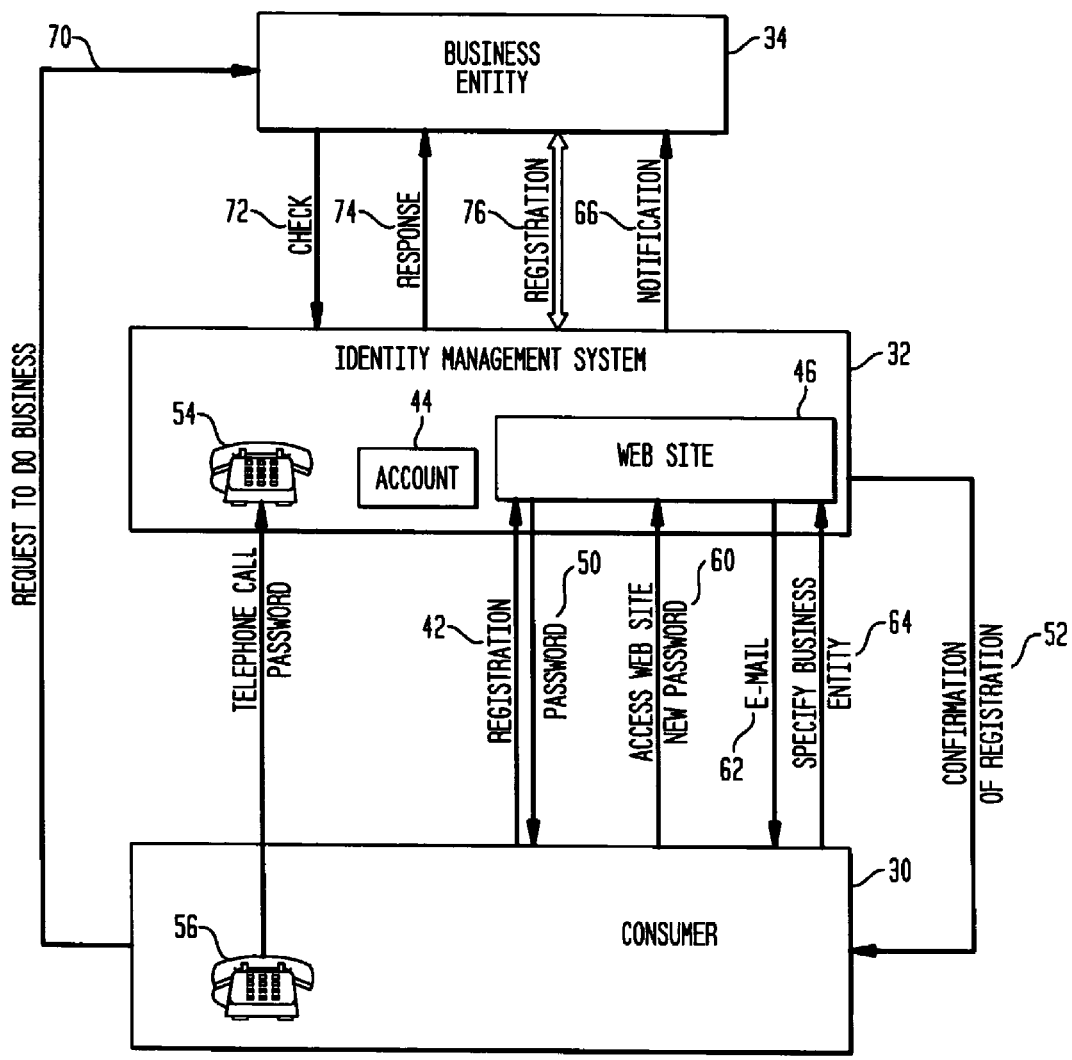
FIG. 3 schematically illustrates a specific example of a preferred embodiment of this invention.

FIG. 3 illustrates a more specific example of a preferred embodiment of this invention. With reference to FIG. 3, consumer 30 initially registers, at represented at 42, with the Identity Access Management System 32 (hereinafter referred to as "IAM") and establishes an IAM account 44 using an IAM web site 46 and specifies information comprising, inter alia, a name, home address, e-mail address, home telephone number, and a credit card number to pay an IAM fee, or agrees to be invoiced for the IDM fee at the home address specified. As represented at 50, a password is provided to consumer 30 by the web site 46 upon completion of registration, either by being displayed at the web site, or by being sent in an e-mail. A confirmation, represented at 52, of the registration (hereinafter referred to as "mailed confirmation") which includes an account number is sent to consumer 30 at the home address specified at the time of registration using a mailing service, in one example the U.S. Postal Service.

Other types of mailing services, such as an overnight mailing service, could also be used. Further, special U.S. Postal mailing services, such as certified and/or return receipt mail could also be used to help ensure and track delivery to consumer 30. A home phone number specified by consumer 30 during registration, and the password provided by the web site or sent via e-mail subsequent to registration are not included in the mailed confirmation. Similarly, the account number included in the mailed confirmation is not provided by the IAM web site during registration, so as to provide a separation of identifying information at the IAM web site and in the mailed confirmation.

When consumer 30 receives the mailed confirmation, directions are included therewith instructing consumer 30 to call a telephone number, in one example a toll free telephone number, associated with the IAM in order to activate the IAM account registered at the IAM web site. The directions further instruct consumer 30 to call the telephone number, represented at 54, associated with the IAM only from the home telephone number, represented at 56, specified in the registration at the IAM web site. When consumer 30 calls the telephone number associated with the IAM, consumer 30 is requested by a Voice Response Unit (hereinafter referred to as "VRU") to enter the account number provided in the mailed confirmation, and the password provided by the IAM web site or e-mailed during registration. When consumer 30 correctly enters the account number and password, the VRU verifies, using in one example a Caller ID system, that the call by consumer 30 is originating from the home telephone number specified at the IAM web site during registration.

The IAM account 44 is activated only if consumer 30 enters the correct account number and password, and the VRU can verify that the call by consumer 30 is originating from the home telephone number specified at the IAM web site during registration. Upon completion of an IAM account activation attempt, the VRU indicates whether IAM account activation has been successful by instructing consumer 30 to access the IAM web site for further instructions. An IAM account activation failure is indicated only by a disconnection of the call, so as to not provide a party attempting a fraudulent registration and/or activation with clues as to how to successfully complete the activation. After a given number of unsuccessful activation attempts, in one example 3 attempts, the IAM account registration is revoked, and the account is deleted.

After successfully activating the IAM account 44 using the VRU, consumer 30 accesses the IAM web site 46, and uses the previously provided account number and password to sign on to the web site. Consumer 30 is informed that the password is expired, and instructed to enter a new password, represented at 60. After successfully entering a new password, an e-mail, represented at 62, is sent to consumer 30 confirming that the password has been successfully changed. Once consumer 30 has successfully changed the password and finishes signing onto the IAM web site, consumer 30 may, as represented at 64, specify a desire to establish a business relationship with at least one business entity using the IAM web site.

The desire to establish a business relationship with at least one business entity may be specified using a list, in one example a pull-down list, of business entities that have previously registered as service extenders 34 with the IAM. If consumer 30 wishes to specify a business entity that has not previously registered as one of service extenders 34 with the IAM, a text entry field is provided to allow consumer 30 to enter a name and other information related to the business entity, for example an e-mail or postal mailing address of the business entity. Once this information is entered, a notification, represented at 66, may be sent, for example by e-mail or the U.S. Postal Service, alerting the business entity to the desire of consumer 30 to establish a business relationship with the entity.

The IAM web site 46 displays a list of business entities with which consumer 30 has specified a desire to establish a business relationship. A method to remove business entities from this list is also provided, in one example by consumer 30 selecting a check box next to an entity with a pointing device such as a mouse. Consumer 30 may also specify an expiration period for each entry which corresponds to a business entity on the list. A default expiration period, in one example 90 days, may be specified, or different expiration periods may be specified for each entry on the list, for example by selecting among a plurality of radio buttons having respective values of 30, 60, and 90 days with a pointing device such as a mouse, or typing a value using a data entry field.

Subsequent to specifying a desire to establish a business relationship with a business entity using the IAM web site 46, consumer 30 may follow a routine process, in one example completing, signing, and mailing a credit card application, to make a request, represented at 70, for a product or service from the business entity. Upon receiving the request from consumer 30, the business entity performs a check, represented at 72, with the IAM to determine if consumer 30 has specified a desire to establish a business relationship with the business entity. The check may be performed by an employee of the business entity by signing onto the IAM web site and entering the name and/or other identifying information of consumer 30 to run a query so as to determine if consumer 30 has, in fact, specified a desire to establish a business relationship with the business entity. The response, represented at 74, that a business entity receives to a check is simply a positive or negative indicator as to whether consumer 30 has specified a desire to establish a business relationship with the business entity; no additional information about consumer 30 is provided by the IAM in response to a check.

If a high volume of checks are to be performed, an Application Programming Interface (hereinafter referred to as "API") to the IAM may be utilized to perform a check. The API would provide routines that perform a check over a secure network connection, in one example a Secure Socket Layer connection, to the IAM. The routines of the API could be linked to business entity supplied software that is utilized by employees of the business entity for processing requests from consumer 30 for products or services. In an alternative embodiment, the API could be used by special, trusted business entities, in one example credit reporting bureaus, to include in a report, in one example a credit report, information on all the business entities with which consumer 30 has specified a desire to establish a business relationship.

If a business entity has not already registered at the LAM web site, a registration, represented at 76, may be performed with a business entity account number and a temporary password being sent to the business entity at an e-mail address specified during registration. The business entity may complete the registration by using the account number and temporary password to specify a new password. A fee may be charged to the business entity for both registration and each check that is performed by using, for example, a credit card or by sending an invoice via the U.S. Postal Service to the business entity. Both business entity and consumer registrations are stored in at least one secure, encrypted database.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of authenticating personal identity, comprising:
    a person, having a unique personal identity, accessing an identity access management (IAM) system using a hardware computer, said person having a private key to uniquely identify said person:
    said person using said private key to register with the identity access management system;
    said person using said identity access management system to indicate an interest in establishing a business relationship with a specified business entity;
    a user contacting said specified business entity and alleging to have said unique personal identity; and
    said specified business entity, using another private key that uniquely identifies said specified business entity, contacting the identity access management system and determining if said person having said unique personal identity has used the identity access management system to indicate an interest in establishing a business relationship with the specified business entity;
    wherein the accessing includes:
    the person initially registering with the IAM and establishing an IAM account using an IAM website, and specifying information including a name, a home address, an e-mail address, and a specified telephone number,
    the IAM website providing an initial password to the person via an e-mail;
    the IAM sending to the person a confirmation of the registration, including an account number, by a paper delivery system to said home address, said confirmation not including said telephone number and said initial password, and wherein said account number is not provided to the person during the initially registering, thereby providing a separation of identifying information at the website and in said confirmation, said confirmation further including instructions for the person to call a given telephone number to activate the IAM account;
    the person calling the given telephone number;
    when the person calls the given telephone number, asking the person to enter the account number included in the confirmation, and the initial password provided by the IAM website during the initial registering;
    when the person enters the account number included in the confirmation and the initial password provided by the IAM website, verifying that the person is calling from the specified telephone number;
    activating the IAM account only if the person enters the account number included in the confirmation and the initial password provided by the IAM website, and if it is verified that the calling is from the specified telephone number;
    upon completion of an attempt to activate the IAM account, instructing the person to access the website for further instructions;
    the person then accessing the website using, the account number and the initial password; and
    informing the person that the initial password is expired, and the person entering a new password.

2. The method according to claim 1, wherein said person using said identity management system includes:
    after the person enters the new password, the person then specifying a desire to establish a business relationship with at least one business entity, including specifying said desire by using a pull-down list of business entities that have previously registered with the IAM as service extenders;
    sending a notification to said at least one business entity to alert said at least one business entity to the desire of the person to establish a business relationship with said at least one business entity;
    the website displaying a list of business entities with which the person has specified a desire to establish a business relationship;
    the person removing some of the business entities from said list; and
    specifying a default expiration period for each entry on said list.

* * * * *